United States Patent [19]

Sadamori et al.

[11] Patent Number: 4,679,045
[45] Date of Patent: Jul. 7, 1987

[54] SEQUENCING DATA TRANSMISSION PROCESS

[75] Inventors: Yuuichi Sadamori; Keini Maeda, both of Hyogo, Japan

[73] Assignee: Mitsubishi Denki Kabushiki Kaisha, Tokyo, Japan

[21] Appl. No.: 736,381

[22] Filed: May 21, 1985

[30] Foreign Application Priority Data

May 22, 1984 [JP] Japan ............................ 59-101758

[51] Int. Cl.$^4$ .............................................. H04Q 9/00
[52] U.S. Cl. ......................... 340/825.07; 340/825.52; 340/825.5; 364/136
[58] Field of Search ............... 340/825.07, 825.52, 340/825.5, 825.03, 825.54, 825.08; 370/85; 364/136

[56] References Cited

U.S. PATENT DOCUMENTS

| | | | |
|---|---|---|---|
| 4,199,662 | 4/1980 | Lowe, Jr. ............................ | 370/85 |
| 4,366,478 | 12/1982 | Masuda et al. ................ | 340/825.03 |
| 4,400,694 | 8/1983 | Wong et al. .................... | 340/825.54 |
| 4,468,655 | 8/1984 | Iwata ............................... | 340/825.54 |

OTHER PUBLICATIONS

"Data Communication System Introduction", issued by Ohm Co., Ltd., Jan. 30, 1980, pp. 118–119.

Primary Examiner—Donald J. Yusko
Attorney, Agent, or Firm—Bernard, Rothwell & Brown

[57] ABSTRACT

In a data transmission system wherein data are transferred between a control station and a plurality of tributary stations under the control of the control station, the tributary stations are sequentially selected and during the selection of each tributary station, data is transmitted first from the control station to the selected tributary station, and then from the tributary station to the control station; the control station and tributary station performing collection and processing of data during the transmission times to overcome delays and wait periods.

2 Claims, 7 Drawing Figures

SEQUENCING DATA TRANSMISSION PROCESS

BACKGROUND OF THE INVENTION

1. Field of the Invention

The present invention relates to a data transmission system wherein a control station and tributary stations coming under the control of the control station are established among terminal connected to a transmission line in the system and regulation of transmission is all left in the charge of the control station.

2. Description of the Prior Art

As an instance of such a system the polling-addressing is well known.

In this system, the control station sequentially interrogates the tributary stations by sequentially polling or adressing the tributary stations through their connected common transmission line, and after each tributary station is polled, transmits and/or receives data in response to the answers from the polled tributary station.

Therefore, in such a case where all the tributary stations have information to be transmitted and the control station has the necessity for transmitting data to all the tributary stations, the polling or addressing by the control station with waiting or processing of a response from all the tributary stations is a wasteful thing. It is further necessary that a received transmission be judged whether it is for polling or addressing, or requesting receipt of data or transmission of data before transmission of a response or data can be conducted, and this means that the transmission line is left idle while the judgement and processing of data are being made and therefore the transmission efficiency is considerably lowered.

SUMMARY OF THE INVENTION

The principal object of the invention is to provide a data transmission process which enables collection of data for transmission and processing of data received to be made while transmission or receipt of data is being made, whereby efficiency of the transmission line is improved and the data transmission speed is increased.

In the data transmission process, wherein data are transmitted between a control station and a number of tributary stations connected with the control station through a common transmission line which is under the control of the control station, and one tributary station at a time is selected in predetermined sequence by the control station, the present invention provides: transmission of data from the control station to the selected tributary station through the transmission line; transmission of the data from the selected tributary station to the contol station indicating completion of normal receipt of data upon completion of the same; and collecting of data to be transmitted and processing of received data by the control station and the selected tributary station while transmission and receipt of earlier said data are being made at transmission portions of the control station and the selected tributary station.

DETAILED DESCRIPTION OF THE PREFERRED EMBODIMENTS

Referring now to the accompanying drawings, a preferred embodiment of the present invention will be described in the following.

Figure 1:
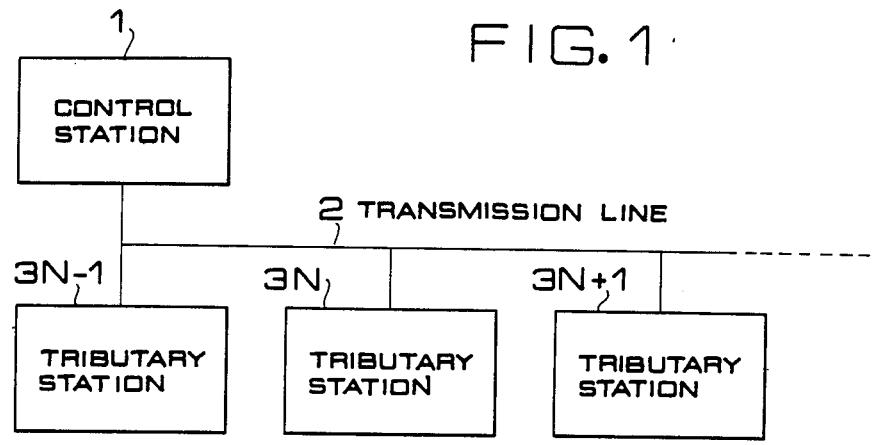
FIG. 1 is a connection diagram showing consitiution of the data transmission system of the present invention.
Figure 2:
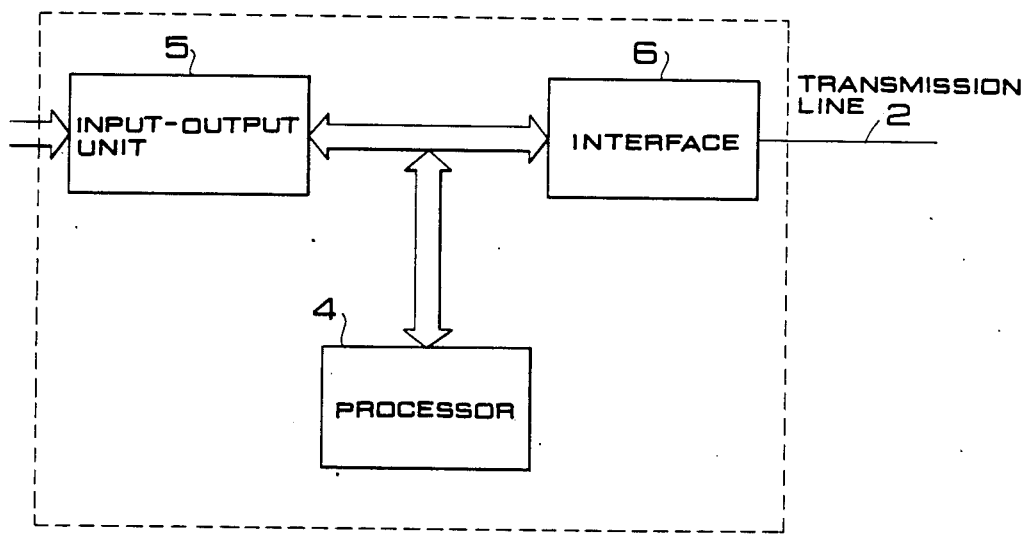
FIG. 2 is a block diagram showing in more detail one station out of the control station and tributary stations as shown in FIG. 1.

FIG. 1 is a connection diagram showing constitution of the transmission system, wherein a control station 1 is connected with tributary stations 3N−1, 3N, and 3N+1 through a common transmission line 2. FIG. 2 is a block diagram showing constitution of one station out of the control station 1 and the tributary stations 3N−1, 3N, and 3N+1, wherein the processor 4 collects blocks of data for transmission through the input-output unit 5, transfers blocks of data to and from the interface 6 which transmits and receives blocks of data, and processes the received data.

Figure 3A:
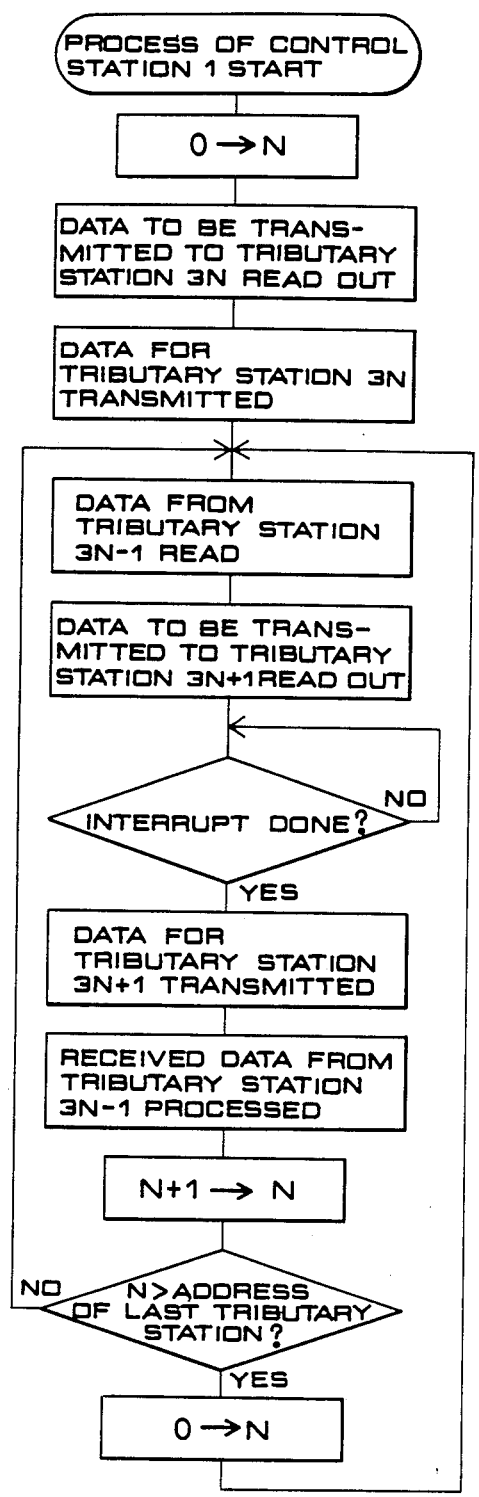
FIGS. 3a, 3b and 3c are flow charts of the devices in the data transmission system of the invention.
Figure 3B:
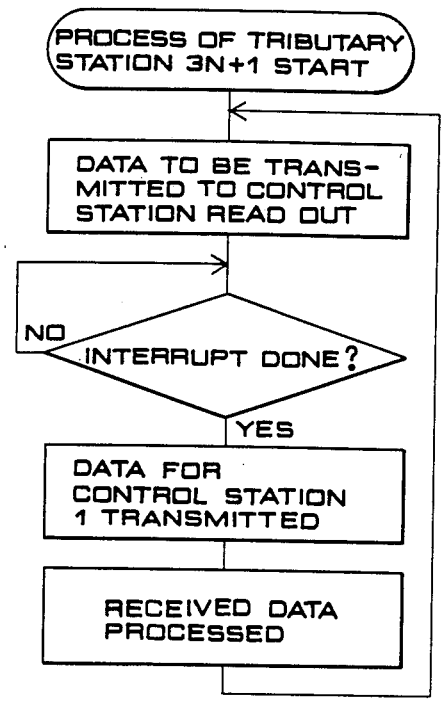
Figure 3C:
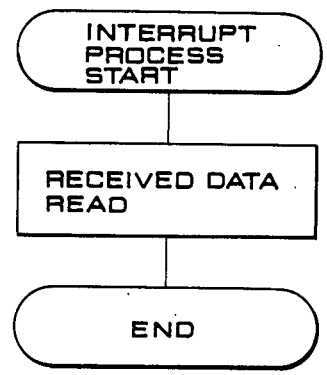
Figure 4:
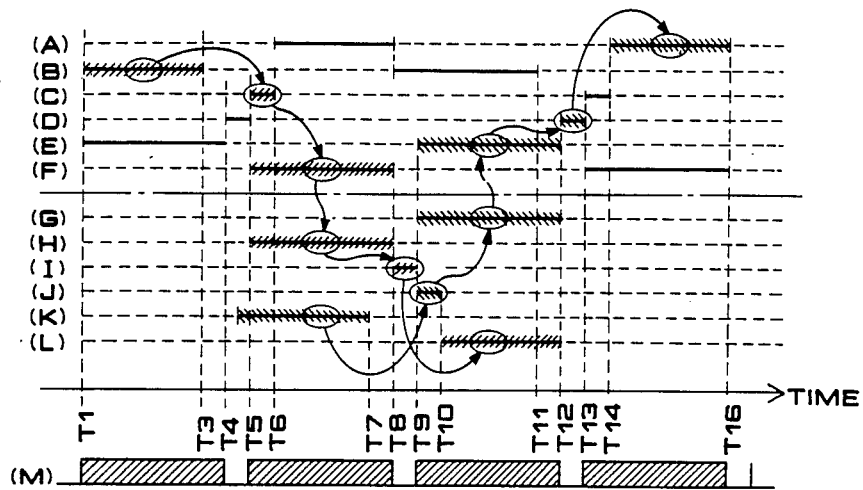
FIGS. 4 and 5 both are operational timing charts concerning the system of the invention.
Figure 5:
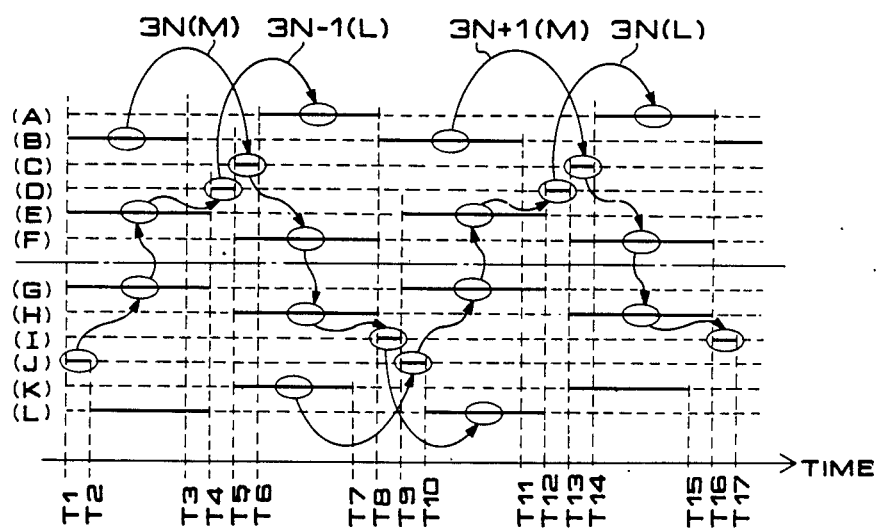

In FIG. 3a, is a flow chart showing collection, transfer and transmission processes conducted in the control station 1, FIG. 3b is a flow chart showing these processes conducted in the tributary station 3N+1, and FIG. 3c is a flow chart showing the interrupt process performed by the processor 4. FIGS. 4 and 5 are timing charts concerning the system of the present invention.

Referring to FIG. 4 processor 4 of the control station 1 collects the data to be transmitted to N-th tributary station 3N during the period of time T1 to T3 as shown in B, while waiting for completion of receipt of data from the (N−1)-th tributary station 3N−1. Upon completion of the receipt of the data from the tributary station 3N−1 at the time point T4 as shown in E, the processor 4 of the control station 1 reads or transfers the received data from the interface 6 during the period of time T4 to T5 as shown in D, and during the period of time T5 to T6 as shown in C, supplies or transfers to the interface 6 the data for the tributary station 3N which were collected or read out between the time points T1 and T3, and, further, during the period of time T6 to T8 as shown in A, processes the data which were read between the time points T4 and T5. The interface 6 of the control station 1, in response to the input thereto, starts transmission of the data during the period of time T5 to T6 as shown in C and completes the transmission at the time point T8 as shown in F.

On the other hand, the interface 6 of the tributary station 3N receives the above signal during the period of time T5 to T8 and completes it at the time point T8 as shown in H, and the processor 4 of the tributary station reads or transfers the received data from the interface during the period of time T8 to T9 as shown in I, and after outputting or transferring data, collected for transmission during the time T4 through T7 from the input-output unit 5 of the tributary station as shown in K, to its interface 6 during the period of time T9 to T10 as shown in J, processes the data received from the control station 1, as shown in L, during the period of time T10 to T12.

In this way, the data read out by the control station 1 during the period of time T1 to T3 as shown in B are processed in the selected tributary station during the period of time T10 to T12 as shown in L.

In the mean time, the data from the tributary station 3N is transmitted to the interface 6 of the station 1 through the transmission line 2 during the period of time T9 to T12 as shown in G, and so the control station 1, completing the receipt of the data at the time point T12 as shown in E, reads the received data by the processor 4 during the period of time T12 to T13 as shown in D. The processor of the control station 1, completing the processing of the data received from the tributary station 3N−1 at the time point T8 as shown in A, collects the data to be transmitted to the tributary station 3N+1 during the period of time T8 to T11 as shown in B and outputs the read out data to the interface 6 during the period of time T13 to T14 as shown in C, whereupon the interface 6 starts transmitting the data to the tributary station 3N+1. The control station 1 process the data, which was read during the period of time T12 to T13 as shown in D, during the period of time T14 to T16 as shown in A, whereby the data read out by the tributary station 3N earlier than the time point T7 as shown in K are processed by the control station 1 from the time point T14 as shown in A and the processing ends at the time point T16. In M, the working status of the transmission line 2 is indicated, namely the portions where oblique lines are drawn indicates that the transmission line was then in use.

FIG. 5 indicates signal flows in the control station 1 and that in the number of tributary stations 3N−1 to 3N+1, wherein the same reference characters as in FIG. 1 represent the same items. In the chart, 3N(M) indicates the flow of data which the control station 1 outputs to the tributary station 3N, 3N−1(L) indicates the flow of data from the tributary station 3N−1 to the control station 1, and 3N (L) indicates the data flow from the tributary station 3N to the control station 1, and 3N+1(M) indicates the flow of signal from the control station 1 to the (N+1)-th tributary station 3N+1.

The above description referring to FIGS. 4 and 5 was made for convenience of explanations in such a way that the transfer process for the received signal in D or I should occur after the collection process in B or K has been finished, giving such an impression that the system would not operate properly if not so. This, however, is not a problem. As an example the control station 1, the transfer process for the received data as shown in D subsequent to the completion of the receipt of the data as shown in E can be preferentially conducted as an interrupt process called at the end of the transmission process E. It is judged whether or not the interrupt transfer process D for the received data has been completed at the time point when the collection process as shown in B has been finished, and if the transfer process D has been completed, the transfer process as shown in C will be performed, or if the process as shown in D is not yet completed, the system will wait till the transfer process D is ended and perform the process as shown in C. Then, the system is adapted to place no restriction on the timing of the transfer process for the received data as shown in D since this process is conducted as an interrupt process.

As described so far, the invention eliminates the need for polling or addressing and makes processing of received data and reading out of data to be transmitted possible while the transmitting portion is transmitting or receiving data, and thereby greatly improves the utility efficiency of the transmission line and increases the speed of the data transmission.

What is claimed is:
1. A data transmission process for tranferring data between a control station and a plurality of tributary stations connected with said control station by a common transmission line, wherein each of the control station and the tributary stations includes a processor for collecting and processing blocks of data, and an interface connected between the processor and the transmission line for receiving and transmitting blocks of data from and to the transmission line; the data transmission process comprising the steps of:

selecting, by means of the control station, the tributary stations one at a time in a predetermined sequence for receipt and transmission of data;

transferring a block of data previously collected by the control station processor for each selected tributary station to the control station interface when each tributary station is selected;

transmitting the transferred selected tributary block of data by the control station interface over the transmission line from the control station to the selected tributary station;

processing, during the transmission of the selected tributary block of data, previously received control station data by the control station processor;

collecting, during the transmission of the selected tributary block of data, a next control station block of data by the processor of the selected tributary station;

transferring the selected tributary block data by the selected tributary station processor from the selected tributary station interface after the transmission of the selected tributary block of data is completed;

transferring the next control station block of data collected by the selected tributary station processor to the selected tributary station interface after the transfer of the selected tributary block of data from the selected tributary station interface is completed;

transmitting the transferred next control block of data by the selected tributary station interface over the transmission line from the selected tributary station to the control station;

processing, during the transmission of the next control block of data, the selected tributary station block of data by the selected tributary station processor;

collecting, during the transmission of the next control block of data, a next selected tributary block of data by the processor of the control station; and transferring the next control station block of data by the control station processor from the control station interface after the transmission of the next control station block of data is completed.

2. A data transmission process as claimed in claim 1 wherein the step of transferring the selected tributary block of data by the selected tributary station processor, and the step of transferring the next control station block of data by the control station processor are conducted as interrupt processes by the respective processors wherein the interrupt processes are called at the termination of the corresponding transmitting steps.

* * * * *

UNITED STATES PATENT AND TRADEMARK OFFICE
CERTIFICATE OF CORRECTION

PATENT NO. : 4,679,045
DATED : July 7, 1987
INVENTOR(S) : Yuuichi Sadamori et al.

It is certified that error appears in the above-identified patent and that said Letters Patent is hereby corrected as shown below:

Column 1, line 10, "terminal" should be --terminals--;

line 55, "contol" should be --control--;

line 64, "consitiution" should be --constitution--.

Signed and Sealed this

Fifteenth Day of December, 1987

Attest:

DONALD J. QUIGG

*Attesting Officer*        Commissioner of Patents and Trademarks